United States Patent [19]

Pearlman

[11] Patent Number: 4,460,621

[45] Date of Patent: Jul. 17, 1984

[54] REDUCING GLARE FROM THE SURFACE OF A GLASS VIEWING WINDOW

[75] Inventor: Samuel Pearlman, Manheim Township, Lancaster County, Pa.

[73] Assignee: RCA Corporation, New York, N.Y.

[21] Appl. No.: 554,084

[22] Filed: Nov. 21, 1983

[51] Int. Cl.³ .......................... B05D 5/06; B44C 1/22; C03C 15/00; C03C 25/06

[52] U.S. Cl. .......................................... 427/64; 65/31; 156/645; 156/663; 252/79.3; 252/79.4; 427/309

[58] Field of Search ................... 65/31; 156/640, 645, 156/663; 252/79.3, 79.4; 51/317, 284 R; 427/64, 66, 157, 165, 168, 169, 309

[56] References Cited

U.S. PATENT DOCUMENTS 2,622,016 12/1952 Gilstrap et al. ...................... 41/42
2,670,279  2/1954 Szegho et al. ...................... 41/42
3,616,098 10/1971 Falls ..................................... 161/1
3,813,568  5/1974 Scott et al. ......................... 313/92

OTHER PUBLICATIONS

Sales brochure of Malvern Minerals Company, Hot Springs, Arkansas, entitled, "Micro-Crystalline Novaculite in a Bound State of Sub-Division*" (no publication date, no copyright notice).

Primary Examiner—William A. Powell
Attorney, Agent, or Firm—E. M. Whitacre; D. H. Irlbeck; L. Greenspan

[57] ABSTRACT

The novel method comprises impacting an aqueous slurry of solid particles on the surface of a glass viewing window in such manner as to stress the glass in the impacted area of the window without substantial erosion, abrasion or etching of the impacted surface, and then etching the impacted surface with an aqueous fluoride etchant.

14 Claims, 2 Drawing Figures

51 — Impacting an aqueous slurry of solid particles on a glass surface so as to stress but not erode the surface in the impacted area 53 — Etching the impacted surface with an aqueous fluoride etchant until the desired surface finish is realized 51 — Impacting an aqueous slurry of solid particles on a glass surface so as to stress but not erode the surface in the impacted area 53 — Etching the impacted surface with an aqueous fluoride etchant until the desired surface finish is realized

REDUCING GLARE FROM THE SURFACE OF A GLASS VIEWING WINDOW

BACKGROUND OF THE INVENTION

This invention relates to a novel method for reducing glare from the surface of a transparent glass viewing window with low loss in resolution and contrast of the viewed image, and which produces little or no sparkle. The novel method is particularly useful for treating the inner or back surface of the viewing window of a CRT (cathode-ray tube) which is to be used for a television or data display.

A number of problems arise when viewing an image which optically contacts the back surface of the window, such as a video image, through a transparent glass viewing window in a lighted room or compartment. There may be reflections of ambient light sources in the viewer's field from both the front and back major surfaces of the window. Frequently, one or both surfaces are roughened to reduce the effects of such reflections (which are also called glare) on the viewer. By prior processes, a desired degree of surface roughness is provided in two steps. First, the surface is overroughened, e.g., electrolytically or by wet or dry blasting with abrasive material. Then, the overroughened surface is chemically etched with a wet fluoride etchant until the roughness is reduced to the desired value.

Roughening a surface essentially spreads the reflected light over a wider range of angles, most of which are outside the field of the viewer. Roughening a surface results in reduced resolution of the viewed image, since the light from the viewed image is also spread over a wider range of angles. Roughening may also cause "sparkle," which is small local distracting bright spots of light in the viewed image. Sparkle is caused when the random removal of material from the surface produces focusing or lensing of small portions of the image.

Roughening also reduces the contrast of the viewed image with respect to its background because of background light level is raised by the effects of the ambient light illuminating the roughened surface. A gray tint in the glass can offset this loss of contrast, but it also dims the viewed image. Roughening can also adversely affect the deposition of structures, e.g., black matrix pattern or luminescent layer, on the roughened surface.

What is desired is a reduction in glare with little or no loss in resolution and/or contrast of the viewed image, little or no sparkle, and little or no adverse effect on the deposition of structures on the roughened surface.

SUMMARY OF THE INVENTION

In the novel method, the optical characteristics of the surface of a transparent glass viewing window are modified by impacting an aqueous slurry of solid particles, preferably of novaculite, in such manner as to stress the glass in the impacted area without substantial erosion of the impacted area, and then etching the surface with an aqueous liquid fluoride etchant until the desired surface finish is realized. The term "substantial erosion" requires that there be obvious visible frosting or clouding on the surface to the naked human eye.

All of the desired features mentioned above can be realized by practicing the novel method. Glare can be reduced with little or no loss of resolution and contrast in the viewed image. Also, structures can be deposited with little or no adverse effect on the treated surface, and no increase in sparkle.

DETAILED DESCRIPTION OF THE PREFERRED EMBODIMENT

EXAMPLE

Figure 1:
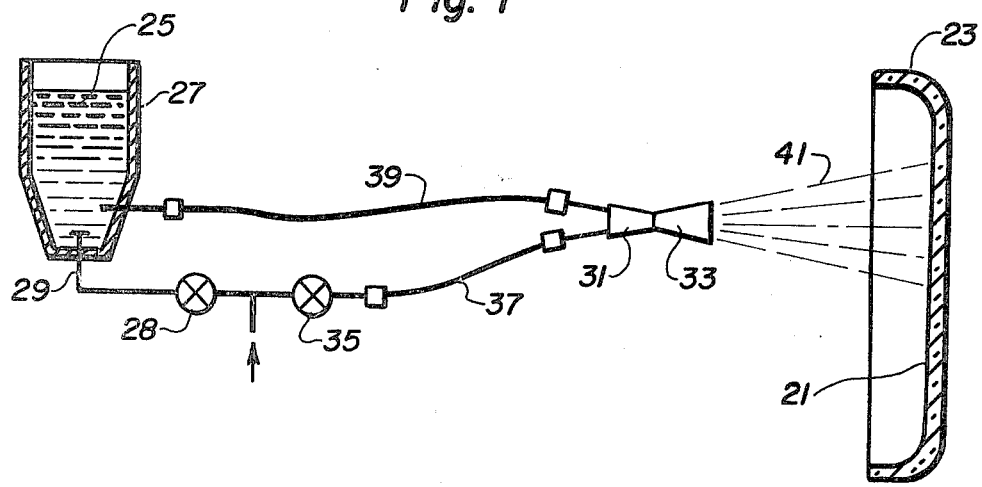
FIG. 1 is a partially-sectional, partially-schematic representation of an apparatus for practicing the novel method.

Referring to FIG. 1, the inner surface 21 of a glass faceplate panel 23 from a 13 V-size data display CRT is cleaned to remove dirt, dust and oil and then placed in a generally-vertical position in a spray booth (not shown). A 20-weight-percent slurry suspension 25 of novaculite (625-mesh marketed by Malvern Mineral Company, Hot Springs, Arkansas) is placed in a slurry tank 27. The suspension 25 is vigorously agitated by rising air bubbles, forcibly introduced as compressed air at the bottom of the tank 27 through a tank-air control valve 28 and a bubbler pipe 29, which bubbles vent to the atmosphere. Compressed air is also supplied to a hydroblast gun 31 (marketed by Pangborn Corp., Hagerstown MD) having a nozzle housing 33 (marketed by Vaporblast Corp., Milwaukee WI) through a gun-air control valve 35 and flexible air piping 37 connected to the gun 31. The nozzle 33 is flared outwardly from about a 0.6-cm (0.25-inch) diameter at the gun to a vertical slot about 2.5-cm (1.0-inch) high and 0.5-cm (3/16-inch) wide at its output end. Slurry is supplied to the gun 31 at atmosphereic pressure through flexible slurry piping 39 from near the bottom of the tank 27. With air pressure of about 130 kilograms per square centimeter (45 psi) applied at the gun 31, a blasting spray 41 of the slurry is delivered through the nozzle 33 against the surface 21; the output end of the nozzle 33 being about 30 to 35 centimeters from the surface 21. The gun 31 and nozzle 33 are moved horizontally in such manner that the spray 41 is scanned over the stationary surface 21 about 12 times at the rate of about one second per pass. Then, the surface 21 is rotated about 90°, and spray 41 is again scanned horizontally over the stationary surface 21 about 12 times at the rate of about one second per pass. The total of 24 passes is implemented in such manner that all surface areas receive substantially the same exposure to the spray 41. The surface 21 is then washed with deionized water and inspected to assure that the hydroblasted surface 21 is not frosted or clouded by the spray treatment. An etchant mixture is prepared containing about 9,080 grams of aqueous 49-weight-percent hydrogen fluoride (HF), 590 grams ammonium bifluoride ($NH_4HF_2$), 545 grams dry polyvinyl alcohol (PVA molecular weight 125,000, 87–89% hydrolyzed) and about 9,000 grams deionized water, to yield an aqueous solution containing by weight about 23.4% HF, 3.1% $NH_4HF_2$ and 2.9% PVA. A quantity of the etchant mixture is placed on the inner horizontal surface 21 of the panel 23, sloshed around the surface 21 for about 30 seconds, and then dumped out. The panel is then rinsed with water. The effect of the etchant mixture is to lightly etch the hydroblasted inner surface 21 to a desired roughness giving a frosted or cloudy appearance. Areas that have not been hydroblasted, such as the sidewalls of the panel, are not etched and remain clear even though they have been contacted with the etchant mixture.

While the reason for this phenomenon is not well understood, it is believed that the hydroblast stresses (but does not abrade) the glass so that the stressed areas are more prone to etching by the etchant. Energy of the stress is stored in the glass and released when the adjacent glass surface is contacted with etchant. When measured, the surface had a roughness averaging about 0.259 micron (10.2 microinches).

Subsequently, a black matrix of graphite was deposited on the treated surface and found to have a good definition that is similar to that of a commercial product. A tricolor (P-22) luminescent screen was deposited on the matrix, then filmed and aluminized and incorporated into a television picture tube. Under nonoperating conditions, the viewing window of the faceplate panel dispersed glare so that the image of a lit three-bulb fluorescent fixture about 8 feet away could not be resolved. Under operating conditions, a luminescent image was free of halation providing the sharply-defined image required of an 80-character-per-line data display, and no sparkle was evident.

GENERAL CONSIDERATIONS

Figure 2:
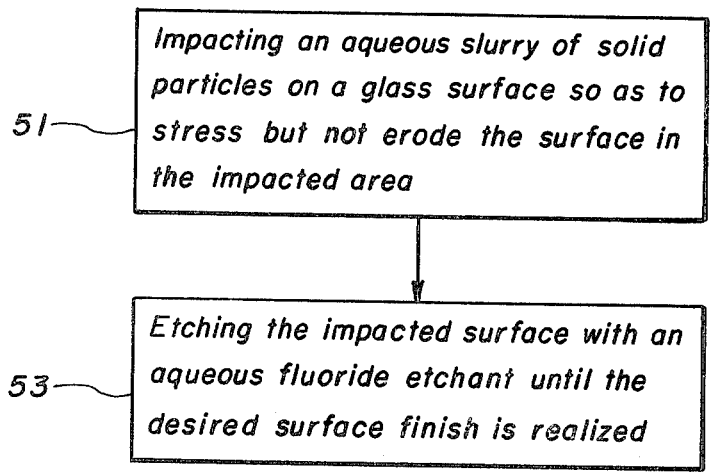
FIG. 2 is a flow-sheet diagram illustrating the novel method.

As shown in the flow sheet diagram of FIG. 2, there are two essential steps in the novel method. By the first essential step shown in the first box 51, an aqueous slurry of solid particles is impacted on a glass surface so as to stress, but not erode, abrade or etch, the surface in the impacted area. Upon completion of this first essential step, the surface appears to be substantially unaltered optically. However, chemically, the impacted area is substantially more active, and is much more easily and rapidly attacked by etchants for glass.

The solid particles may be in any size and/or shape and may be present in any concentration in the slurry to achieve the foregoing object. However, it is preferred that the solid material pass through at least a standard 325-mesh screen, and preferably a standard 1250-mesh screen. Also, the strength of the impaction can be optimized for any particular slurry. In general, it is preferred that the particles be as small as possible, and agglomerates of the particles should pass through a standard 325-mesh sieve and should be easily sheared during impaction.

A preferred solids material for the slurry is the mineral novaculite which is marketed under the trademark "Novacite" by Malvern Minerals Company, Hot Springs, Arkansas. This material is available commercially in several refined grades for use as an abrasive and as a filler. It is preferred to use the finer agglomerates in those grades that are recommended as abrasives, although the novel method does not use the material as an abrasive. Novaculite is a natural, finely-divided, microcrystalline form of silica, which has a unique morphological character, hardness, friability, particle shape and particle size.

The liquid vehicle of the slurry may be any convenient liquid, although water is preferred because of its low cost, ready availability and nonflammable, nontoxic character. The slurry may contain between about 10 and 50 weight percent of solid particles. The slurry may also contain minor ingredients, such as a surfactant, to help maintain a dispersion of the particles. The slurry may be formed into a spray and the particles of the spray accelerated toward the surface by any convenient method using any convenient means. It is preferred to use the method and equipment described in the example using air pressures between about 87 and 261 kilograms per square centimeter (30 and 90 psi). The air pressure affects the strength of the impact of the droplets of the slurry spray. The strength of the impact is also affected by the distance between the nozzle housing and the glass surface, and the angle at which the spray impacts the surface. Generally, the higher the air pressure, the closer the nozzle housing and the closer the impact angle of the spray to the surface is to 90°, the greater will be the strength of the impact. Optimum values for these factors are determined by relatively few trials in the laboratory.

By the second essential step shown by the second box 53 of FIG. 2, the impacted surface is etched with an aqueous fluoride etchant until the desired surface finish is realized. Such etchants are known in the glass-etching art, and formulations thereof may be varied considerably from the formulation given above in the example. Optimum formulations and methods of application can be ascertained with relatively few trials in the laboratory for different glass viewing windows.

The polyvinyl alcohol is used to regulate the viscosity, and the ammonium bifluoride adds the necessary fluoride ions to give the solution the correct etch characteristic. Other materials, such as dextrose, sorbitol, and polyols, have been tried and found effective for viscosity control. Etching time and etchant concentration play an important role in controlling of depth-of-etch. A 30-second etching time with the above-mentioned concentration has been successful. Other etching rates and etchant concentrations can be made to work. Temperatures are room temperatures. Excessive etching time will degrade resolution and reduce gloss. Too little etching time will aid resolution but will not reduce gloss sufficiently to reduce halation and secondary reflections.

Control of the viscosity of the etchant was found to be important because it controlled the rate of chemical reaction at the stressed areas of the glass surface. By controlling the etching rate, the depth-of-etch is regulated, and the etch becomes more lateral rather than depth oriented.

To demonstrate the uniqueness of the novel method and the improved characteristics of the product of the novel method, a 13 V faceplate panel was treated as follows: one half the area was hydroblasted as in the example above, and one half was not. Then, the entire area was etched as in the example. The hydroblasted half became etched as desired, and the other half did not.

Photographs of panels made by hydroblasting with aluminum oxide, silicon carbide or various silicas have shown that grit size and morphological character (hardness, etc.) play a significant role in surface etching after hydroblasting. Hardness (Knoop) as measured on a scale in which diamonds are hardest and equal to 7,000, rates novaculite silica at 820 and silicon carbide at 2,400. Additionally, the lamellar plates and triangular points with rounded edges coupled with minute cracks and fissures as seen under high magnification (2,000X) explain the friable nature of the novaculite silica used in the example. Hydroblasting with this material allows just enough energy to be imparted to the glass surface without rupture of the panel surface. Etching takes place uniformly along the areas stressed by the silica impaction. Because of the large number of particles impacting the surface, the surface becomes stressed uniformly, and etching takes place uniformly.

The novel method can reduce secondary reflection (halation), can simultaneously maintain high resolution of images created behind the glass surface and does not induce sparkle. In addition, it is desirable to be capable of applying a black matrix in an economically viable manner.

Various materials were substituted in the slurry of the example for the ability of the treated surface to produce a black matrix with high resolution. By the novel method, 80-mesh silicon carbide produced a measured surface roughness of 181.1 microinches, 180-mesh aluminum oxide 101.6 microinches, 400-mesh silicon carbide 33.9 microinches and 1,250-mesh novaculite 10.2 microinches. As the surface roughness decreased, the resolution of a black matrix thereon increased.

Two methods are used to evaluate the resolution character of the surface: by laser reflectance and by a Gardner gloss reflectometer. Measurements of reflectance at 45° and 60° are used to evaluate surfaces. To provide a surface unique for high-resolution data display tubes, it is necessary to have a balance between the inner gloss surface and resolution of the surface. Generally, as gloss increases so does the resolution. The novel method reduces the gloss surface without impairment of the resolution character needed in display tubes. The novel method provides a unique, economical means which overcomes the manufacturing variability of the stipple and strain nonuniformity at the glass surface that is normally produced in glass faceplate panel production.

What is claimed is:

1. A method for reducing glare from the surface of a glass viewing window comprising
impacting an aqueous slurry of solid particles on said surface in such manner as to stress the glass in the impacted area without substantial erosion of said impacted surface
and then etching said surface with an aqueous liquid etchant containing active fluoride anions.

2. The method defined in claim 1 wherein said solid particles are of such sizes as to pass through a standard 325-mesh screen.

3. The method defined in claim 2 wherein said solid particles consist essentially of silicon dioxide.

4. The method defined in claim 2 wherein said solid particles consist essentially of novaculite.

5. The method defined in claim 1 wherein said window is for viewing an image subsequently to be produced in optical contact with said surface and to be viewed through said window.

6. A method for reducing glare from the surface of a glass viewing window of a CRT comprising
(a) impacting on a major surface of said window a stream consisting essentially of an aqueous slurry of novaculite particles, said stream impacts at such velocity and said particles are of such sizes as to modify the etching characteristic of said major surface without substantially abrading said major surface and
(b) etching said surface with an aqueous fluoride etchant.

7. The method defined in claim 6 wherein more than 99% of said particles pass through a standard 325-mesh screen.

8. The method defined in claim 6 wherein said major surface is the inner surface of said viewing window.

9. The method defined in claim 8 wherein said window is for viewing a luminescent image generated in a luminescent layer optically contacting to said major surface.

10. A method for preparing a luminescent screen on the inner surface of a glass viewing window of a cathode-ray tube comprising: (A) impacting an aqueous slurry of solid particles on said inner surface in such a manner as to stress said glass in the impacted region thereof without eroding said impacting surface, (B) etching said impacted surface with a liquid fluoride etchant for said glass and then (C) depositing a luminescent screen on said etched surface.

11. The method defined in claim 10 wherein said luminescent screen is deposited by the slurry direct photographic process.

12. The method defined in claim 11 including, prior to step (C), the step of depositing a light-absorbing matrix on said surface.

13. The method defined in claim 10 wherein said solid particles are particles consisting essentially of crystalline silicon dioxide in agglomerates which pass through a standard 325-mesh screen.

14. The method defined in claim 13 wherein said solid particles consist essentially of refined novaculite.

* * * * *